UNITED STATES PATENT OFFICE.

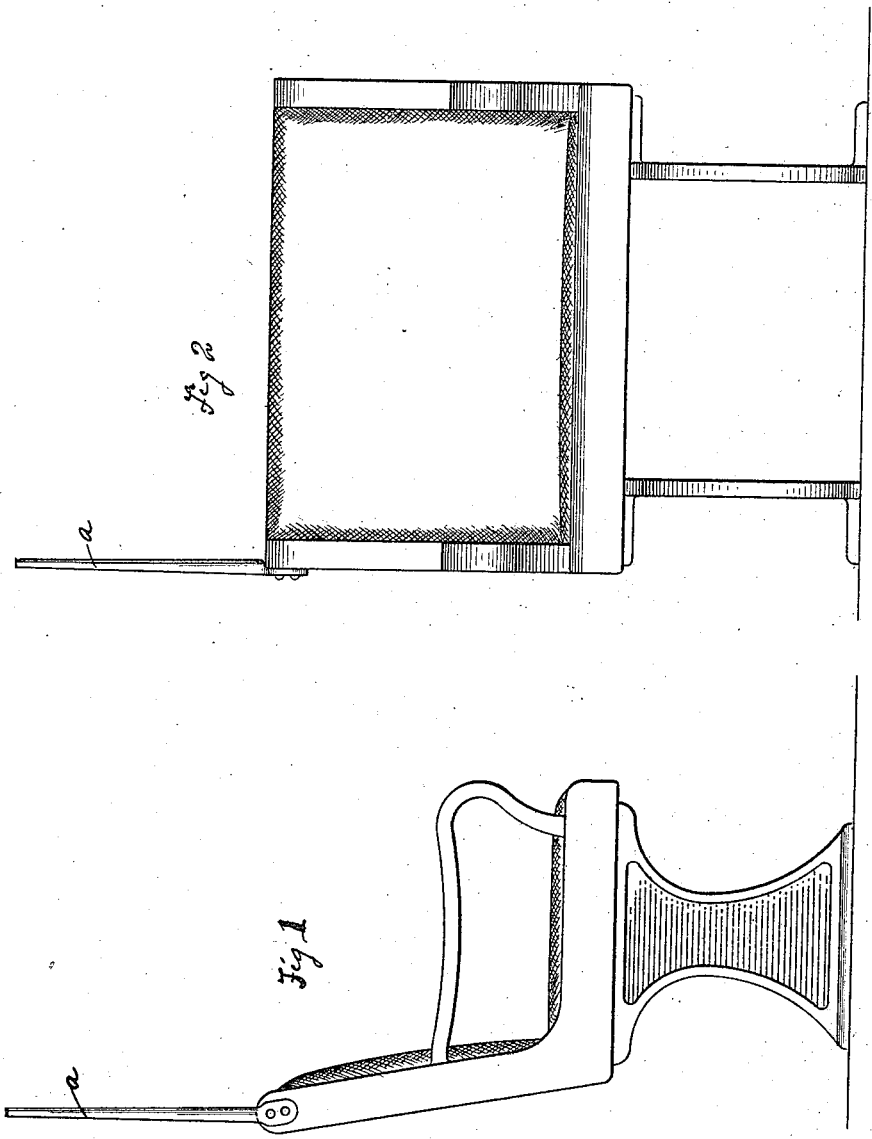

EDMOND REDMOND, OF ROCHESTER, NEW YORK.

STREET-CAR.

1,242,041.      Specification of Letters Patent.      Patented Oct. 2, 1917.

Application filed March 2, 1916. Serial No. 81,644.

*To all whom it may concern:*

Be it known that I, EDMOND REDMOND, a citizen of the United States, residing at Rochester, in the county of Monroe and State of New York, have invented a new and useful Improvement in Street-Cars, of which the following is a specification.

My invention relates to means whereby a person in a street car can, in part, support himself by hand when standing or walking in a moving street car. Heretofore passengers in street cars had to take hold of straps hanging overhead, or of horizontal handles attached to the car seat, to sustain themselves when on foot, and the car was rounding curves, etc. Neither the strap nor the handle set on top of the back of the car seat is satisfactory.

My invention provides a support for the hand that is free from the objections found in the hanging straps or horizontal handles with an opening in it into which the fingers must be inserted.

I attain this purpose of my invention by attaching to the end of the car seat or to the frame of the back thereof which projects into the aisle of the car, a vertical rod or tube, convenient to grasp in the hand, which will extend upward enough to rise at its apex as high as the top of the average passenger's head, and the upper end is to be free.

In the drawing Figure 1 shows an end view of a car seat with the hand-rod *a;* Fig. 2 shows a front view of the car seat with the attachment.

The superiority of my device over all heretofore used for the purpose includes the fact that it enables the passenger to grasp the rod-handle in an easy way with the whole hand, and that it affords support to the passenger no matter in what direction the motion of the car tends to throw him. Two or more persons can grasp the rod at the same time. A passenger walking through the car in either direction can transfer his hand from one rod to another in front of him, thus obtaining continuous safety from stumbling while the car is in motion. The passenger by using it is also free from liability to fall against a fellow passenger who is in a seat, or to touch his or her back in an effort to lay hold of the handle, for the rod will be several inches away from the seated passenger.

I claim:

The combination with a car seat of a rod or tube attached to the seat, arising therefrom to above the height of the passenger, but not rigidly fixed above, and constituting a handle as and for the purpose described.

EDMOND REDMOND.

Witnesses:
    EDWARD M. REDMOND,
    NELSON H. COPP.

Copies of this patent may be obtained for five cents each, by addressing the "Commissioner of Patents, Washington, D. C."